US010643260B2

(12) United States Patent
Johnson et al.

(10) Patent No.: US 10,643,260 B2
(45) Date of Patent: May 5, 2020

(54) SUSPICION CLASSIFIER FOR WEBSITE ACTIVITY (71) Applicant: eBay Inc., San Jose, CA (US)

(72) Inventors: Brian Scott Johnson, Campbell, CA (US); Michael Ching, San Jose, CA (US); Julie Lavee Netzloff, San Jose, CA (US); Vamsi Krishna Salaka, Fremont, CA (US)

(73) Assignee: EBAY INC., San Jose, CA (US)

( * ) Notice: Subject to any disclaimer, the term of this patent is extended or adjusted under 35 U.S.C. 154(b) by 736 days.

(21) Appl. No.: 14/193,219

(22) Filed: Feb. 28, 2014

(65) Prior Publication Data
US 2015/0248715 A1 Sep. 3, 2015

(51) Int. Cl.
G06Q 30/00 (2012.01)
G06Q 30/06 (2012.01)

(52) U.S. Cl.
CPC .............. G06Q 30/0609 (2013.01)

(58) Field of Classification Search
CPC . G06Q 30/0609; G06Q 30/0601–0645; G06Q 30/08
USPC .................... 705/26.1–27.2, 26.35
See application file for complete search history.

(56) References Cited

U.S. PATENT DOCUMENTS

| 8,788,442 | B1* | 7/2014 | Sculley, II | G06N 99/005 706/20 |
| 8,886,587 | B1* | 11/2014 | Hainsworth | G06N 5/025 706/46 |
| 2006/0095404 | A1* | 5/2006 | Adelman | G06F 17/30867 |
| 2011/0235902 | A1* | 9/2011 | Chittar | G06F 17/3025 382/162 |

OTHER PUBLICATIONS

"Replicas, counterfeit items, and unauthorized copies policy." ebay.com. Sep. 28, 2011.*
Mohammad, Rami M., Fadi Thabtah, and Lee McCluskey. "Intelligent rule-based phishing websites classification." IET Information Security 8.3 (2014): 153-160. (Year: 2014).*

* cited by examiner

Primary Examiner — Christopher B Seibert
(74) Attorney, Agent, or Firm — Shook, Hardy & Bacon L.L.P.

(57) ABSTRACT

A system and method of identifying suspicious item-related features are disclosed. In some embodiments, a sample of item listings is received. Each item listing in the sample of item listings may correspond to an item offered for sale on an e-commerce website. Item-related data for each item listing in the sample of item listings may be extracted. Training data comprising identifications of which item listings in the sample of item listings are suspicious and identifications of which item listings in the sample of item listings are not suspicious may be received. A model for classifying a candidate item listing on the e-commerce website as being suspicious may be determined using the training data.

20 Claims, 10 Drawing Sheets

SUSPICION CLASSIFIER FOR WEBSITE ACTIVITY

TECHNICAL FIELD

The present application relates generally to the technical field of search query processing, and, in various embodiments, to systems and methods of classifying suspicious website activity, such as such as suspicious item listings and suspicious item-related activity in e-commerce.

BACKGROUND

E-commerce sites experience obstacles in providing relevant search results because of certain item listings including data or other features that improperly promote the item listings for prominent inclusion in search results.

BRIEF DESCRIPTION OF THE DRAWINGS

Some embodiments of the present disclosure are illustrated by way of example and not limitation in the figures of the accompanying drawings, in which like reference numbers indicate similar elements, and in which.

DETAILED DESCRIPTION

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

The present disclosure provides systems and methods of classifying suspicious item listings and item-related activity in e-commerce. In some embodiments, a sample of item listings is received. Each item listing in the sample of item listings may correspond to an item offered for sale on an e-commerce website. Item-related data for each item listing in the sample of item listings can be extracted. Training data comprising identifications of which item listings in the sample of item listings are suspicious and identifications of which item listings in the sample of item listings are not suspicious can be received. A model for classifying a candidate item listing on the e-commerce website as being suspicious can be determined using the training data.

In some embodiments, the model is configured to determine a suspicion score for the candidate item listing based on item-related data of the candidate item listing, and classify the candidate item listing as being suspicious if the determined suspicion score satisfies a predetermined threshold level.

In some embodiments, an identification of a new candidate item listing is received. The new candidate item listing can be classified as being suspicious based on an application of the model to item-related data of the new candidate item listing. A notification of the new candidate item listing being classified as suspicious can be provided to an administrator of the e-commerce website.

In some embodiments, an identification of a new candidate item listing is received. The new candidate item listing can be classified as being suspicious based on an application of the model to item-related data of the new candidate item listing. The new candidate item listing can then be prevented from being posted on the e-commerce website based on the classification of the new candidate item listing as being suspicious.

In some embodiments, an identification of a new candidate item listing is received. A suspicion score may be determined based on an application of the model to item-related data of the new candidate item listing. A report comprising the suspicion score of the new candidate item listing can then be generated, and the report can be provided to an administrator of the e-commerce website.

In some embodiments, an identification of a new candidate item listing is received. A suspicion score may be determined based on an application of the model to item-related data of the new candidate item listing. The suspicion score of the new candidate item listing can be provided to a corresponding seller of the new candidate item listing.

In some embodiments, a search query is received at a search engine of the e-commerce website from a user on a computing device. Search results can then be determined for the search query. The search results may comprise new candidate item listings. At least one of the new candidate item listings can be classified as being suspicious based on an application of the model to item-related data of the new candidate item listings. The visibility level of the new candidate item listing(s) within the search results may be determined based on the classification of the new candidate item listing(s) as being suspicious. For example, the new candidate item listing(s) classified as being suspicious can be removed from the search results or have its ranking position within the search results modified (e.g., decreased, lowered, downgraded, or otherwise negatively affected) before the search results are displayed to the user on the computing device.

In some embodiments, the item-related data comprises at least one of an item title, an item category, an item description, an item image, an item sale price, and bidding activity.

The methods or embodiments disclosed herein may be implemented as a computer system having one or more modules (e.g., hardware modules or software modules). Such modules may be executed by one or more processors of the computer system. The methods or embodiments disclosed herein may be embodied as instructions stored on a machine-readable medium that, when executed by one or more processors, cause the one or more processors to perform the instructions.

Figure 1:
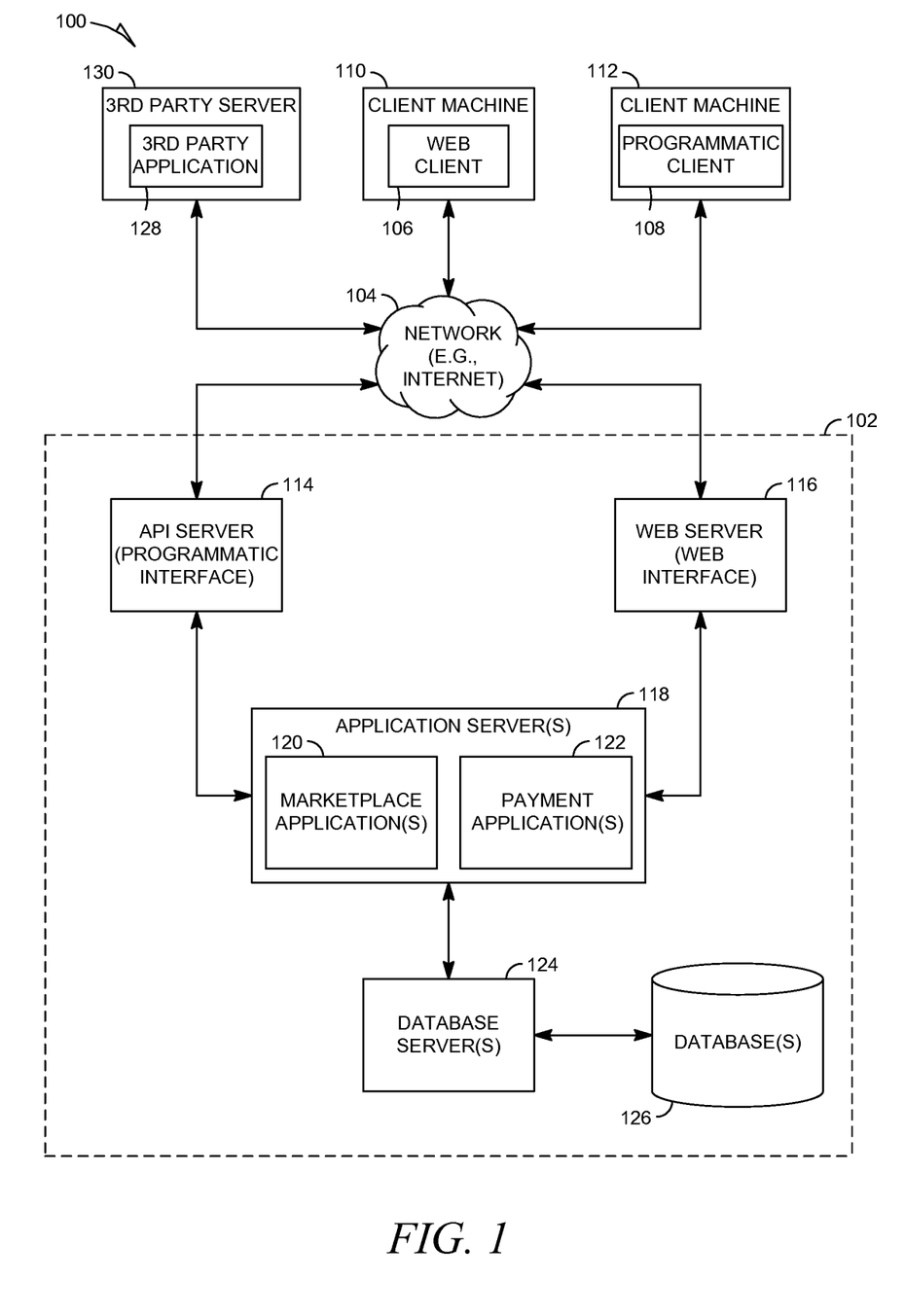
FIG. 1 is a block diagram depicting a network architecture of a system having a client-server architecture configured for exchanging data over a network, in accordance with some embodiments.

FIG. 1 is a network diagram depicting a client-server system 100, within which one example embodiment may be deployed. A networked system 102, in the example forms of a network-based marketplace or publication system, provides server-side functionality, via a network 104 (e.g., the Internet or a Wide Area Network (WAN)) to one or more clients. FIG. 1 illustrates, for example, a web client 106 (e.g., a browser, such as the Internet Explorer browser developed by Microsoft Corporation of Redmond, Wash. State) and a programmatic client 108 executing on respective client machines 110 and 112.

An API server 114 and a web server 116 are coupled to, and provide programmatic and web interfaces respectively to, one or more application servers 118. The application servers 118 host one or more marketplace applications 120 and payment applications 122. The application servers 118 are, in turn, shown to be coupled to one or more database servers 124 that facilitate access to one or more databases 126.

The marketplace applications 120 may provide a number of marketplace functions and services to users who access the networked system 102. The payment applications 122 may likewise provide a number of payment services and functions to users. The payment applications 122 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 120. While the marketplace and payment applications 120 and 122 are shown in FIG. 1 to both form part of the networked system 102, it will be appreciated that, in alternative embodiments, the payment applications 122 may form part of a payment service that is separate and distinct from the networked system 102.

Further, while the system 100 shown in FIG. 1 employs a client-server architecture, the embodiments are, of course not limited to such an architecture, and could equally well find application in a distributed, or peer-to-peer, architecture system, for example. The various marketplace and payment applications 120 and 122 could also be implemented as standalone software programs, which do not necessarily have networking capabilities.

The web client 106 accesses the various marketplace and payment applications 120 and 122 via the web interface supported by the web server 116. Similarly, the programmatic client 108 accesses the various services and functions provided by the marketplace and payment applications 120 and 122 via the programmatic interface provided by the API server 114. The programmatic client 108 may, for example, be a seller application (e.g., the TurboLister application developed by eBay Inc., of San Jose, Calif.) to enable sellers to author and manage listings on the networked system 102 in an off-line manner, and to perform batch-mode communications between the programmatic client 108 and the networked system 102.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more promotional, marketplace, or payment functions that are supported by the relevant applications of the networked system 102.

Figure 2:
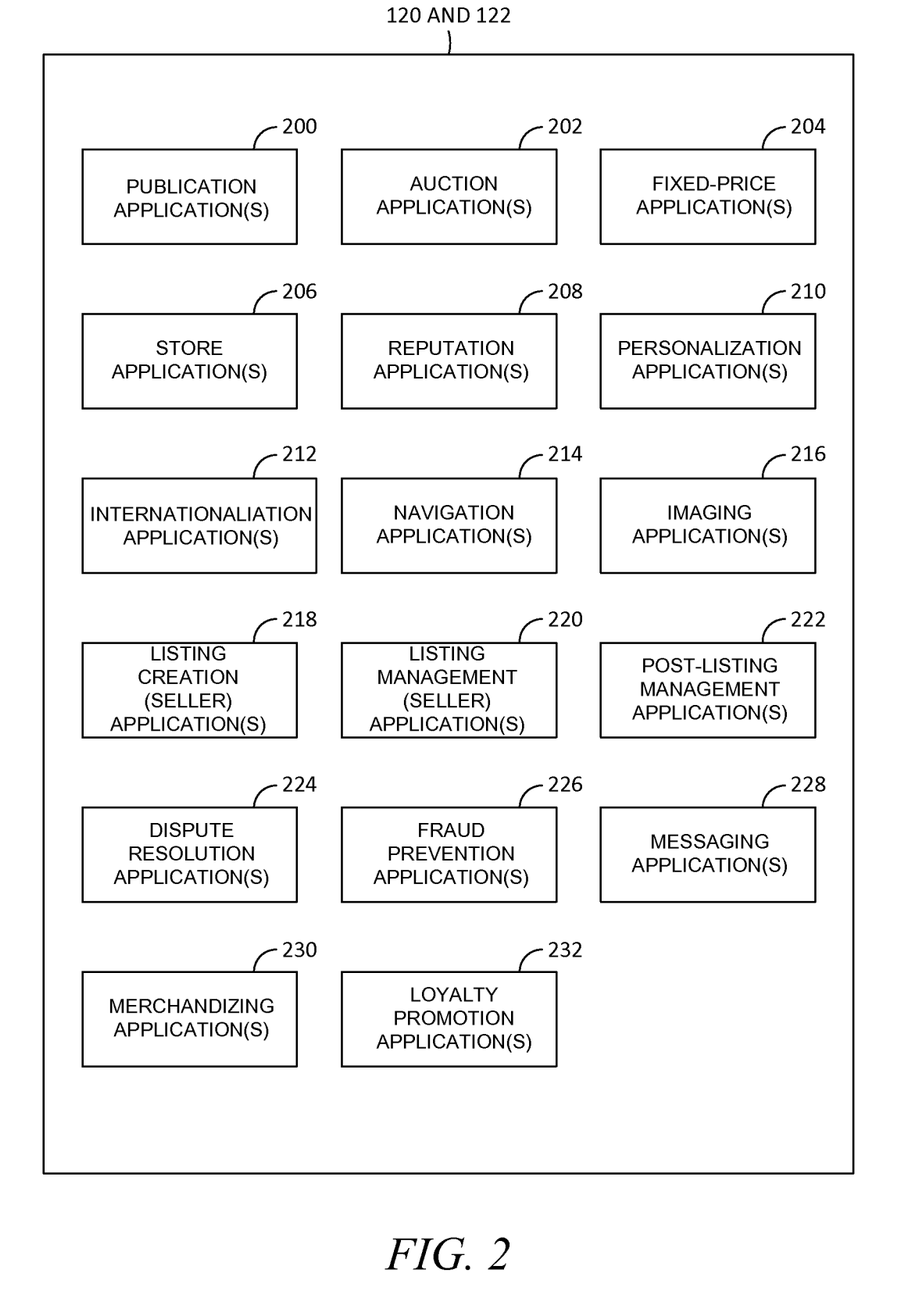
FIG. 2 is a block diagram depicting various components of a network-based publisher, in accordance with some embodiments.

FIG. 2 is a block diagram illustrating multiple marketplace and payment applications 120 and 122 that, in one example embodiment, are provided as part of the networked system 102. The applications 120 and 122 may be hosted on dedicated or shared server machines (not shown) that are communicatively coupled to enable communications between server machines. The applications 120 and 122 themselves are communicatively coupled (e.g., via appropriate interfaces) to each other and to various data sources, so as to allow information to be passed between the applications 120 and 122 or so as to allow the applications 120 and 122 to share and access common data. The applications 120 and 122 may, furthermore, access one or more databases 126 via the database servers 124.

The networked system 102 may provide a number of publishing, listing, and price-setting mechanisms whereby a seller may list (or publish information concerning) goods or services for sale, a buyer can express interest in or indicate a desire to purchase such goods or services, and a price can be set for a transaction pertaining to the goods or services. To this end, the marketplace and payment applications 120 and 122 are shown to include at least one publication application 200 and one or more auction applications 202, which support auction-format listing and price setting mechanisms (e.g., English, Dutch, Vickrey, Chinese, Double, Reverse auctions etc.). The various auction applications 202 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 204 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with auction-format listings, and allow a buyer to purchase goods or services, which are also being offered for sale via an auction, for a fixed-price that is typically higher than the starting price of the auction.

Store applications 206 allow a seller to group listings within a "virtual" store, which may be branded and otherwise personalized by and for the seller. Such a virtual store may also offer promotions, incentives, and features that are specific and personalized to a relevant seller.

Reputation applications 208 allow users who transact, utilizing the networked system 102, to establish, build, and maintain reputations, which may be made available and published to potential trading partners. Consider that where, for example, the networked system 102 supports person-to-person trading, users may otherwise have no history or other reference information whereby the trustworthiness and credibility of potential trading partners may be assessed. The reputation applications 208 allow a user (e.g., through feedback provided by other transaction partners) to establish a reputation within the networked system 102 over time. Other potential trading partners may then reference such a reputation for the purposes of assessing credibility and trustworthiness.

Personalization applications 210 allow users of the networked system 102 to personalize various aspects of their interactions with the networked system 102. For example a user may, utilizing an appropriate personalization application 210, create a personalized reference page on which information regarding transactions to which the user is (or has been) a party may be viewed. Further, a personalization application 210 may enable a user to personalize listings and other aspects of their interactions with the networked system 102 and other parties.

The networked system 102 may support a number of marketplaces that are customized, for example, for specific geographic regions. A version of the networked system 102 may be customized for the United Kingdom, whereas another version of the networked system 102 may be customized for the United States. Each of these versions may operate as an independent marketplace or may be customized (or internationalized) presentations of a common underlying marketplace. The networked system 102 may, accordingly, include a number of internationalization applications 212 that customize information (and/or the presentation of information) by the networked system 102 according to predetermined criteria (e.g., geographic, demographic or marketplace criteria). For example, the internationalization applications 212 may be used to support the customization of information for a number of regional websites that are operated by the networked system 102 and that are accessible via respective web servers 116.

Navigation of the networked system 102 may be facilitated by one or more navigation applications 214. For example, a search application (as an example of a navigation application 214) may enable key word searches of listings published via the networked system 102. A browse application may allow users to browse various category, catalogue, or inventory data structures according to which listings may be classified within the networked system 102. Various other navigation applications 214 may be provided to supplement the search and browsing applications.

In order to make the listings available via the networked system 102, as visually informing and attractive as possible, the applications 120 and 122 may include one or more imaging applications 216, which users may utilize to upload images for inclusion within listings. An imaging application 216 also operates to incorporate images within viewed listings. The imaging applications 216 may also support one or more promotional features, such as image galleries that are presented to potential buyers. For example, sellers may pay an additional fee to have an image included within a gallery of images for promoted items.

Listing creation applications 218 allow sellers to conveniently author listings pertaining to goods or services that they wish to transact via the networked system 102, and listing management applications 220 allow sellers to manage such listings. Specifically, where a particular seller has authored and/or published a large number of listings, the management of such listings may present a challenge. The listing management applications 220 provide a number of features (e.g., auto-relisting, inventory level monitors, etc.) to assist the seller in managing such listings. One or more post-listing management applications 222 also assist sellers with a number of activities that typically occur post-listing. For example, upon completion of an auction facilitated by one or more auction applications 202, a seller may wish to leave feedback regarding a particular buyer. To this end, a post-listing management application 222 may provide an interface to one or more reputation applications 208, so as to allow the seller conveniently to provide feedback regarding multiple buyers to the reputation applications 208.

Dispute resolution applications 224 provide mechanisms whereby disputes arising between transacting parties may be resolved. For example, the dispute resolution applications 224 may provide guided procedures whereby the parties are guided through a number of steps in an attempt to settle a dispute. In the event that the dispute cannot be settled via the guided procedures, the dispute may be escalated to a third party mediator or arbitrator.

A number of fraud prevention applications 226 implement fraud detection and prevention mechanisms to reduce the occurrence of fraud within the networked system 102.

Messaging applications 228 are responsible for the generation and delivery of messages to users of the networked system 102, such as, for example, messages advising users regarding the status of listings at the networked system 102 (e.g., providing "outbid" notices to bidders during an auction process or to providing promotional and merchandising information to users). Respective messaging applications 228 may utilize any one of a number of message delivery networks and platforms to deliver messages to users. For example, messaging applications 228 may deliver electronic mail (e-mail), instant message (IM), Short Message Service (SMS), text, facsimile, or voice (e.g., Voice over IP (VoIP)) messages via the wired (e.g., the Internet), Plain Old Telephone Service (POTS), or wireless (e.g., mobile, cellular, WiFi, WiMAX) networks.

Merchandising applications 230 support various merchandising functions that are made available to sellers to enable sellers to increase sales via the networked system 102. The merchandising applications 230 also operate the various merchandising features that may be invoked by sellers, and may monitor and track the success of merchandising strategies employed by sellers.

The networked system 102 itself, or one or more parties that transact via the networked system 102, may operate loyalty programs that are supported by one or more loyalty/promotions applications 232. For example, a buyer may earn loyalty or promotion points for each transaction established and/or concluded with a particular seller, and be offered a reward for which accumulated loyalty points can be redeemed.

Figure 3:
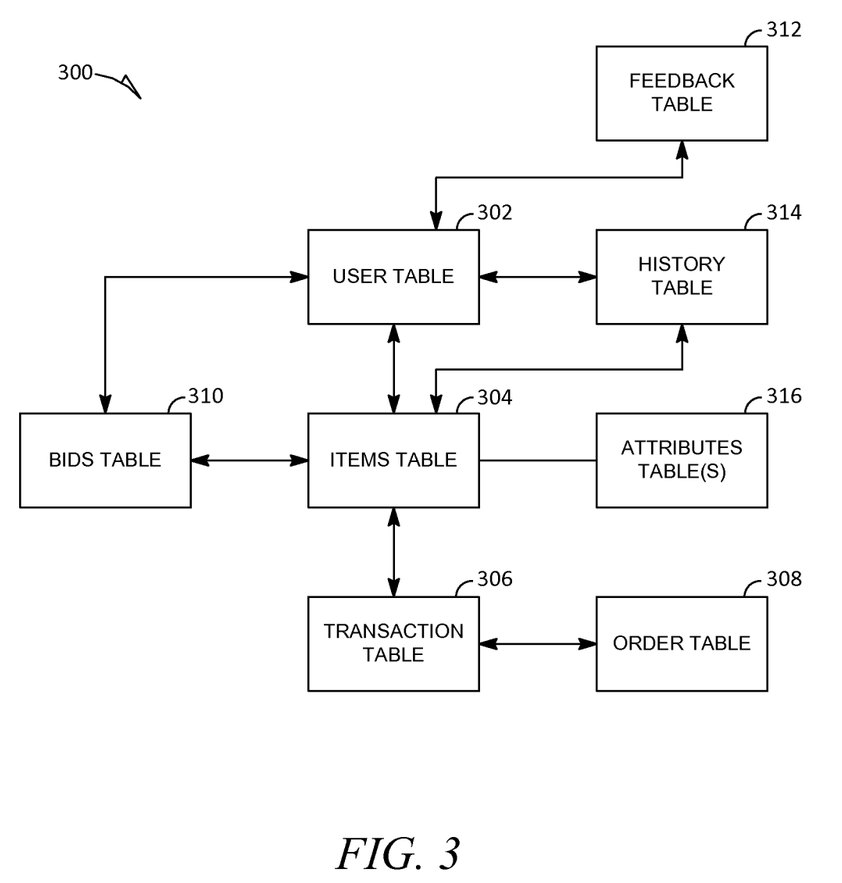
FIG. 3 is a block diagram depicting various tables that may be maintained within a database, in accordance with some embodiments.

FIG. 3 is a high-level entity-relationship diagram, illustrating various tables 300 that may be maintained within the database(s) 126, and that are utilized by and support the applications 120 and 122. A user table 302 contains a record for each registered user of the networked system 102, and may include identifier, address and financial instrument information pertaining to each such registered user. A user may operate as a seller, a buyer, or both, within the networked system 102. In one example embodiment, a buyer may be a user that has accumulated value (e.g., commercial or proprietary currency), and is accordingly able to exchange the accumulated value for items that are offered for sale by the networked system 102.

The tables 300 also include an items table 304 in which are maintained item records for goods and services that are available to be, or have been, transacted via the networked system 102. Each item record within the items table 304 may furthermore be linked to one or more user records within the user table 302, so as to associate a seller and one or more actual or potential buyers with each item record.

A transaction table 306 contains a record for each transaction (e.g., a purchase or sale transaction) pertaining to items for which records exist within the items table 304.

An order table 308 is populated with order records, each order record being associated with an order. Each order, in turn, may be with respect to one or more transactions for which records exist within the transaction table 306.

Bid records within a bids table 310 each relate to a bid received at the networked system 102 in connection with an auction-format listing supported by an auction application 202. A feedback table 312 is utilized by one or more reputation applications 208, in one example embodiment, to construct and maintain reputation information concerning users. A history table 314 maintains a history of transactions to which a user has been a party. One or more attributes tables 316 record attribute information pertaining to items for which records exist within the items table 304. Considering only a single example of such an attribute, the attributes tables 316 may indicate a currency attribute associated with a particular item, the currency attribute identifying the currency of a price for the relevant item as specified by a seller.

As previously mentioned, e-commerce sites experience obstacles in providing relevant search results because of certain item listings including data or other features that improperly promote the item listings for prominent inclusion in search results. One example of such improper promotion includes a seller attempting to list the same item for sale under multiple concurrent item listings in order to increase the chances that the seller's item will be included in search results, as well as increase the number of times the seller's item appears in the search results. Although the multiple listings comprise the same item for sale, the seller can attempt to distinguish their titles, categories, descriptions, images, sale prices, seller account information, and other attributes when creating the item listings in an attempt to fool the e-commerce website into believing that the item listings are for different items, and thus improperly flood the marketplace with multiple listings for the same item.

Another example of improper promotion includes a seller including misleading item-related data in the item listing in order to increase the item listing's seeming relevance to a search query and attractiveness to potential buyers. The seller can include popular, but inaccurate or misleading, keywords in the title or description of the item listing. For example, the seller of a smartphone could include the phrase "better than an iPhone" in the title or description of the smartphone listing, even though the seller is not selling an iPhone®, in an attempt to have the seller's item listing be included in any search results for a search query that includes "iPhone" in it.

Yet another example of improper promotion includes shill bidding, where someone—including the seller, family of the seller, friends of the seller, employees of the seller, or anyone else acting as an agent for the seller—bids on an item with the intent to artificially increase its price or desirability.

Yet another example of improper promotion includes shill buying and shill buying, where someone—including the seller, family of the seller, friends of the seller, employees of the seller, or anyone else acting as an agent for the seller—buys on an item for the sole purpose of providing fake positive feedback for the seller of the item, thereby artificially increasing the reputation of the seller, which can increase the chances of any item listings of the seller being included in search results.

Other examples of improper promotion are also addressed by the features disclosed herein and are within the scope of the present disclosure.

Figure 4:
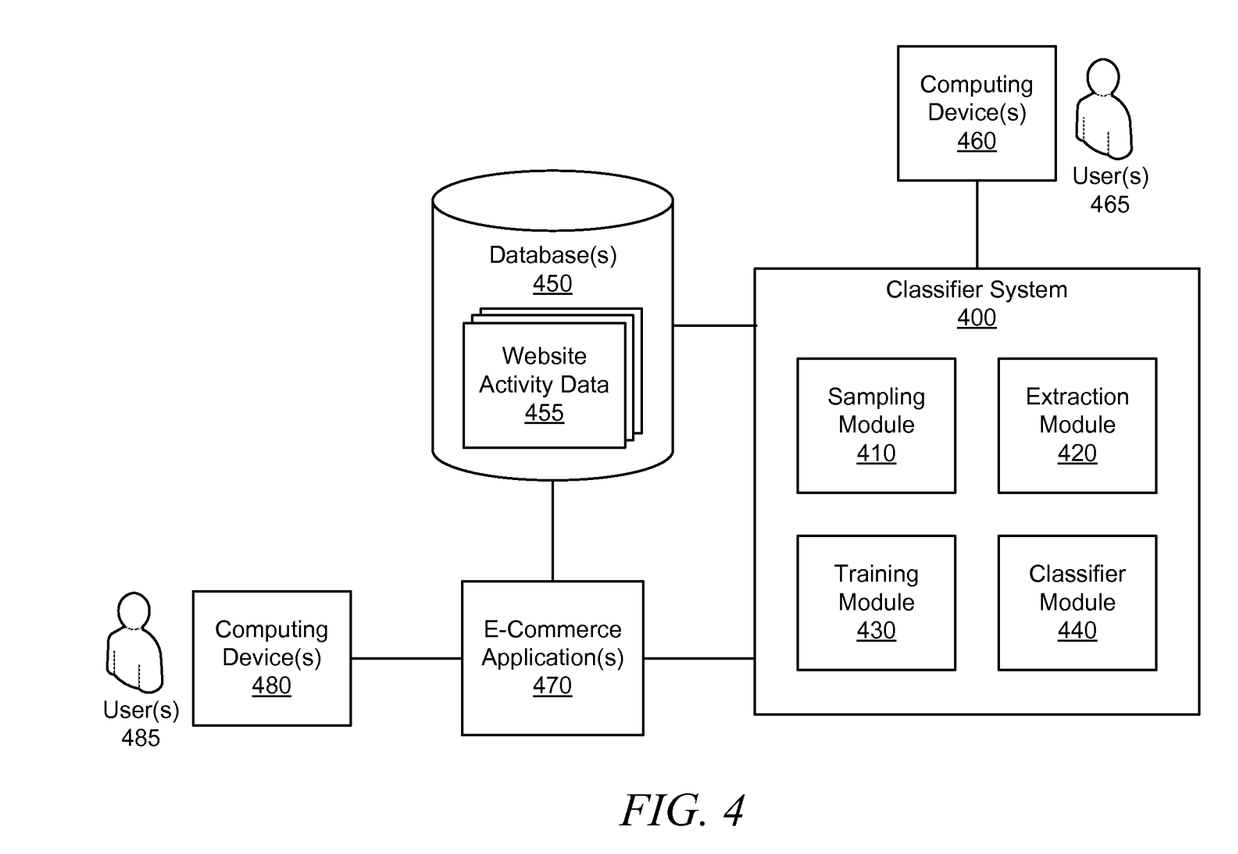
FIG. 4 is a block diagram illustrating a classifier system, in accordance with some embodiments.

FIG. 4 is a block diagram illustrating a classifier system 400, in accordance with some embodiments. Classifier system 400 may be incorporated into application server(s) 118 in FIG. 1. However, other configurations are also within the scope of the present disclosure. In some embodiments, classifier system 400 comprises a sampling module 410, an extraction module 420, a training module 430, and a classifier module 440.

In some embodiments, sampling module 410 is configured to retrieve, or otherwise receive, a sample of website activity data 455 from one or more databases 450. Database(s) 450 may incorporate or be incorporated into database(s) 126 in FIG. 1. Website activity data 455 may comprise any data related to activity on a website. In some embodiments, website activity data 455 comprises item listings. Each item listing in the sample of website activity data 455 may correspond to an item offered for sale on an e-commerce website (e.g., eBay.com®). Although the examples discussed below refer to the use of item listings as website activity data 455, it is contemplated that other types of website activity data 455 are also within the scope of the present disclosure. In some embodiments, website activity data 455 additionally or alternatively comprises seller and/or buyer information (e.g., selling history, buying history, account profile information, browsing behavior, shopping behavior, history of violating any policies of the website, etc.). Accordingly, these other types of website activity data 455 can be applied to the methods, operations, and features discussed herein as alternatives or additions to item listings.

In some embodiments, extraction module 420 is configured to extract item-related data for each item listing in the sample of item listings. The item-related data for each item listing may comprise item-related data of one or more certain types. For example, the type of item-related data can be an item title. Other types of item-related data include, but are not limited to, an item category, an item description, an item image, an item sale price, and bidding activity on an item. Any combination of one or more types of item-related data can be extracted.

The extracted item-related data can be provided to one or more users 465 on one or more computing devices 460. These users 465 can act as judges, reviewing the item-related data to determine which item listings are suspicious (e.g., improperly promoting item or seller of item) and which item listings are not suspicious. Users 465 can then provide these determinations as training data to the classifier system 400 via their respective computing devices 460.

In some embodiments, training module 430 is configured to receive the training data. The training data may comprise identifications of which item listings in the sample of item listings are suspicious and identifications of which item listings in the sample of item listings are not suspicious. The training module 430 may be further configured to determine a model for classifying a candidate item listing on the e-commerce website as being suspicious. This determination can made using the training data. In some embodiments, a new model is generated based on the training data. In some embodiments, an already existing model is modified based on the training data.

In some embodiments, the model is configured to determine a suspicion score for a candidate item listing based on item-related data of the candidate item listing. The model can be configured to classify a candidate item listing as being suspicious if the determined suspicion score of the item listing satisfies a predetermined threshold level (e.g., if the suspicion score exceeds a predefined threshold score).

It is contemplated that the model for classifying a candidate item listing as being suspicious can be used in a variety of ways. In some embodiments, the model can be used in conjunction with operations of one or more e-commerce application 470 of an e-commerce website (e.g., marketplace applications 120 and payment applications 122 in FIG. 2). These e-commerce application(s) 470 may be accessed and used by one or more users 485 on their corresponding computing devices 480. The users 485 may include potential buyers searching for items on the e-commerce website, sellers who are creating, or have created, item listings on the e-commerce website, and administrators (or other agents or employees) of the e-commerce website performing management and maintenance operations with respect to the content on the e-commerce website (e.g., removing suspicious item listings from the e-commerce website or contacting sellers of suspicious item listings).

In some embodiments, a notification of an item listing being classified as suspicious can be provided to an administrator of the corresponding e-commerce website. In some embodiments, an item listing classified as being suspicious can be prevented from being posted on the corresponding e-commerce website based on that classification. In some embodiments, a report comprising one or more suspicion scores of one or more item listings on an e-commerce website can be generated, and the report can be provided to an administrator of the e-commerce website. In some embodiments, the suspicion score of an item listing can be provided to a corresponding seller of the item listing, either during the process of creating the item listing on the e-commerce website or shortly thereafter in order to enable an innocent seller to make modifications to an item listing that has aroused suspicion. In some embodiments, the model can be used to prevent item listings from being provided to users in search results. In some embodiments, the model can be used to determine the visibility level of item listings within search results, such as by removing an item listing from search results or negatively affecting the ranking position of an item listing within search results based on a classification of the item listing as being suspicious. Other uses of the classifier model are also within the scope of the present disclosure.

In some embodiments, computing devices 460 and 480 can include, but are not limited to desktop computers, laptop computers, smart phones, and tablet computers. Other types of computing devices 460 and 480 are also within the scope of the present disclosure.

Any of the communication described herein between any of the systems, devices, databases, modules, services, and websites can be achieved via one or more networks (e.g., network 104 in FIG. 1). The network(s) may include any network that enables communication between or among machines, databases, and devices. Accordingly, the network(s) may include a wired network, a wireless network (e.g., a mobile or cellular network), or any suitable combination thereof. The network(s) may include one or more portions that constitute a private network, a public network (e.g., the Internet), or any suitable combination thereof. Other configurations are also within the scope of the present disclosure.

Figure 5:
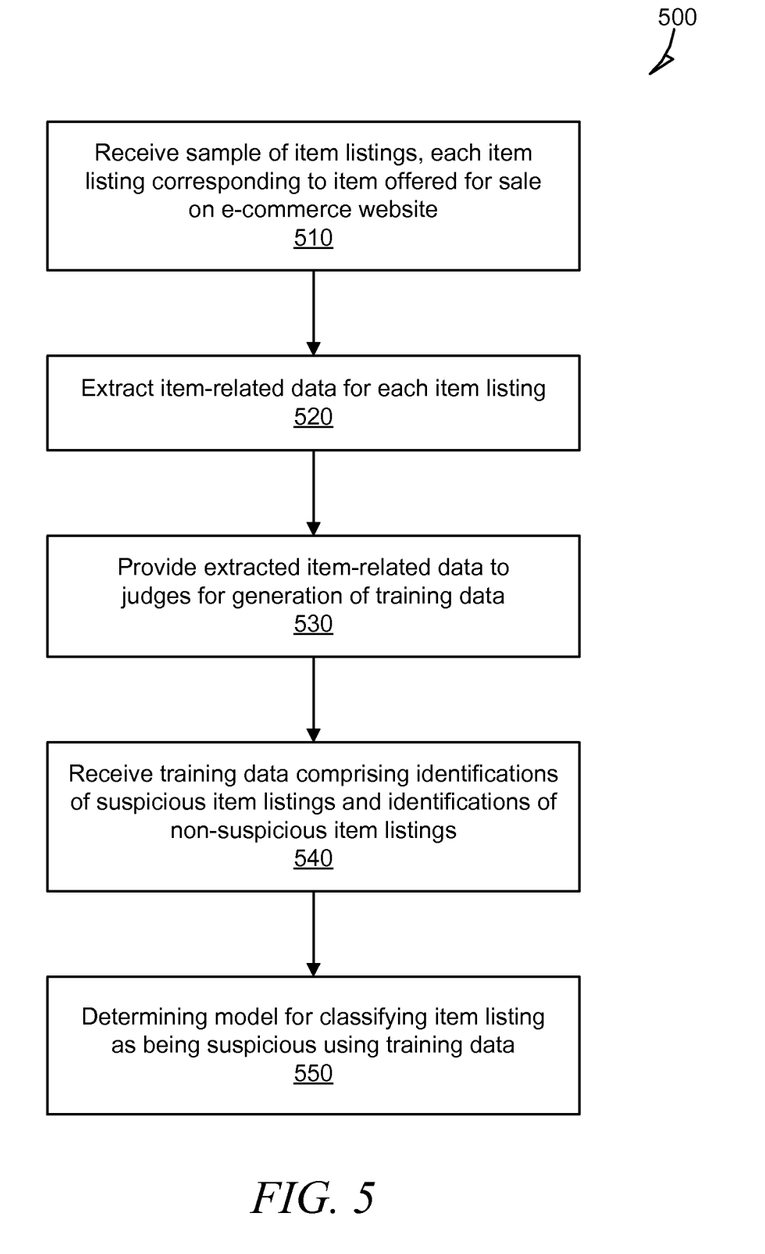
FIG. 5 is a flowchart illustrating a method of training a classifier, in accordance with some embodiments.

FIG. 5 is a flowchart illustrating a method 500 of training a classifier, in accordance with some embodiments. The operations of method 500 may be performed by a system or modules of a system (e.g., classifier system 400 in FIG. 4). At operation 510, a sample of item listings can be received. Each item listing in the sample of item listings may correspond to an item offered for sale on an e-commerce website. At operation 520, item-related data for each item listing in the sample of item listings can be extracted. At operation 530, the extracted item-related data can be provided to judges (e.g., people) for generation of training data. The judges may provide this training data, such as by submitting their determinations about the sampled item listings via their computing devices. At operation 540, the training data can be received. The training data may comprise identifications of which item listings in the sample of item listings are suspicious and identifications of which item listings in the sample of item listings are not suspicious. At operation 550, a model for classifying a candidate item listing on the e-commerce website as being suspicious can be determined using the training data. It is contemplated that the operations of method 500 may incorporate any of the other features disclosed herein.

Figure 6:
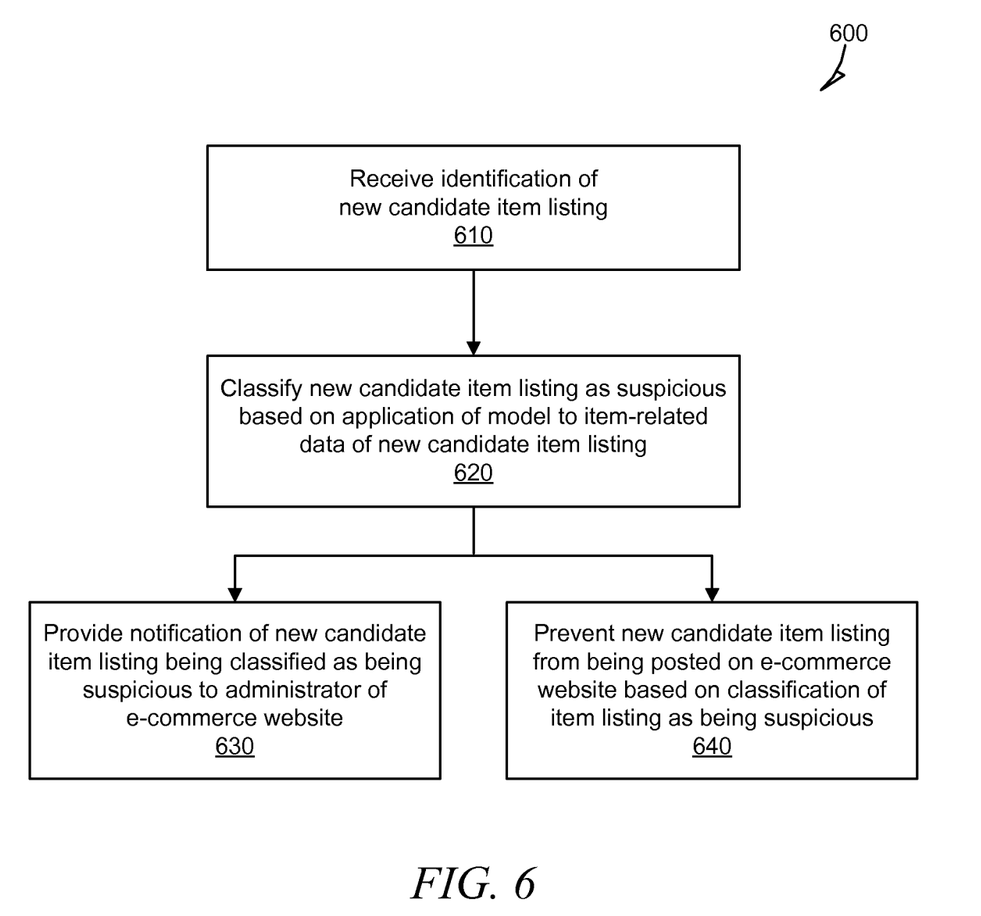
FIG. 6 is a flowchart illustrating a method of using the classifier, in accordance with some embodiments.

FIG. 6 is a flowchart illustrating a method 600 of using the classifier, in accordance with some embodiments. The operations of method 600 may be performed by a system or modules of a system (e.g., classifier system 400 in FIG. 4). At operation 610, an identification of a new candidate item listing can be received. At operation 620, the new candidate item listing can be classified as being suspicious based on an application of the model to item-related data of the new candidate item listing. As previously discussed, the classification of the new candidate item listing as being suspicious can be used in a variety of ways. At operation 630, a notification of the new candidate item listing being classified as suspicious can be provided to an administrator of the e-commerce website based on the classification. In some embodiments, a seller associated with the new candidate item listing being classified as suspicious can be flagged as suspicious, and an administrator of the e-commerce website can be notified of such designation. At operation 640, the new candidate item listing can be prevented from being posted on the e-commerce website based on the classification of the new candidate item listing as being suspicious. It is contemplated that the operations of method 600 may incorporate any of the other features disclosed herein.

Figure 7:
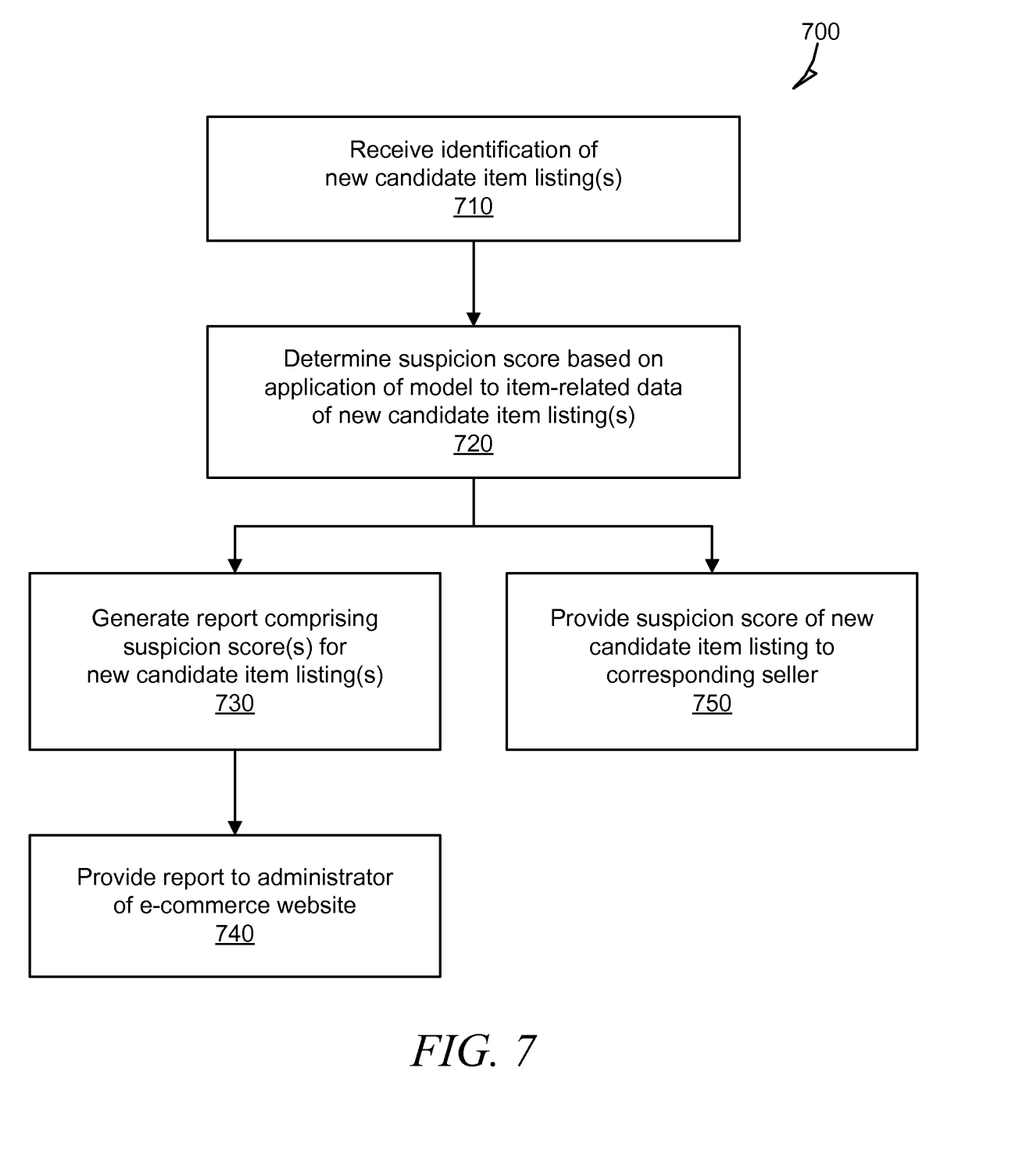
FIG. 7 is a flowchart illustrating a method of using the classifier, in accordance with some embodiments.

FIG. 7 is a flowchart illustrating a method 700 of using the classifier, in accordance with some embodiments. The operations of method 700 may be performed by a system or modules of a system (e.g., classifier system 400 in FIG. 4). At operation 710, an identification of one or more new candidate item listings can be received. At operation 720, a suspicion score for the new candidate item listing(s) may be determined based on an application of the model to item-related data of the new candidate item listing(s). Suspicion scores can be used in a variety of ways. At operation 730, a report comprising the suspicion score(s) of the new candidate item listing(s) can be generated, and the report can be provided to an administrator of the e-commerce website at operation 740. At operation 740, the suspicion score(s) of the new candidate item listing(s) can be provided to the corresponding seller(s) of the new candidate item listing(s). It is contemplated that the operations of method 700 may incorporate any of the other features disclosed herein.

Figure 8:
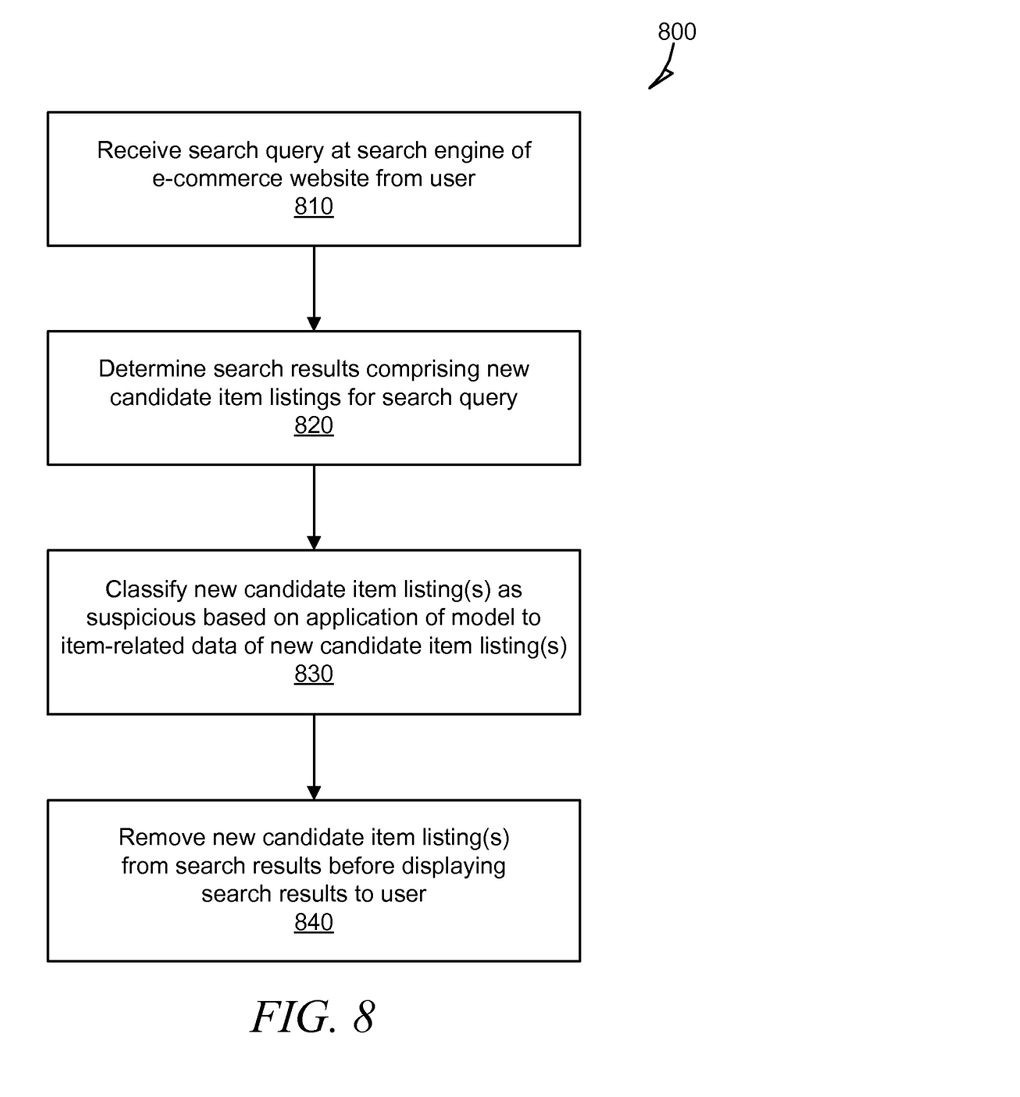
FIG. 8 is a flowchart illustrating a method of using the classifier, in accordance with some embodiments.

FIG. 8 is a flowchart illustrating a method 800 of using the classifier, in accordance with some embodiments. The operations of method 800 may be performed by a system or modules of a system (e.g., classifier system 400 in FIG. 4). At operation 810, a search query can be received at a search engine of the e-commerce website from a user on a computing device. At operation 820, search results can be determined for the search query. The search results may comprise new candidate item listings. At operation 830, at least one of the new candidate item listings can be classified as being suspicious based on an application of the model to item-related data of the new candidate item listings. At operation 840, the visibility level of the new candidate item listing(s) within the search results may be determined, based on the classification of the new candidate item listing(s) as being suspicious, before the search results are displayed to the user on the computing device. For example, the new candidate item listing(s) classified as being suspicious can be removed from the search results or have its ranking position within the search results modified (e.g., decreased, lowered, downgraded, or otherwise negatively affected) before the search results are displayed to the user on the computing device. It is contemplated that the operations of method 800 may incorporate any of the other features disclosed herein.

As previously discussed, website activity data 455 may comprise any data related to activity on a website. While some of the embodiments discussed herein have focused on item listings, the features of the present disclosure can be applied to other types of website activity data 455 as well. For example, in some embodiments, website activity data 455 additionally or alternatively comprises seller and/or buyer information (e.g., selling history, buying history, account profile information, browsing behavior, shopping behavior, history of violating any policies of the website, etc.). Accordingly, these other types of website activity data 455 can be applied to the methods, operations, and features discussed herein as alternatives or additions to item listings.

Figure 9:
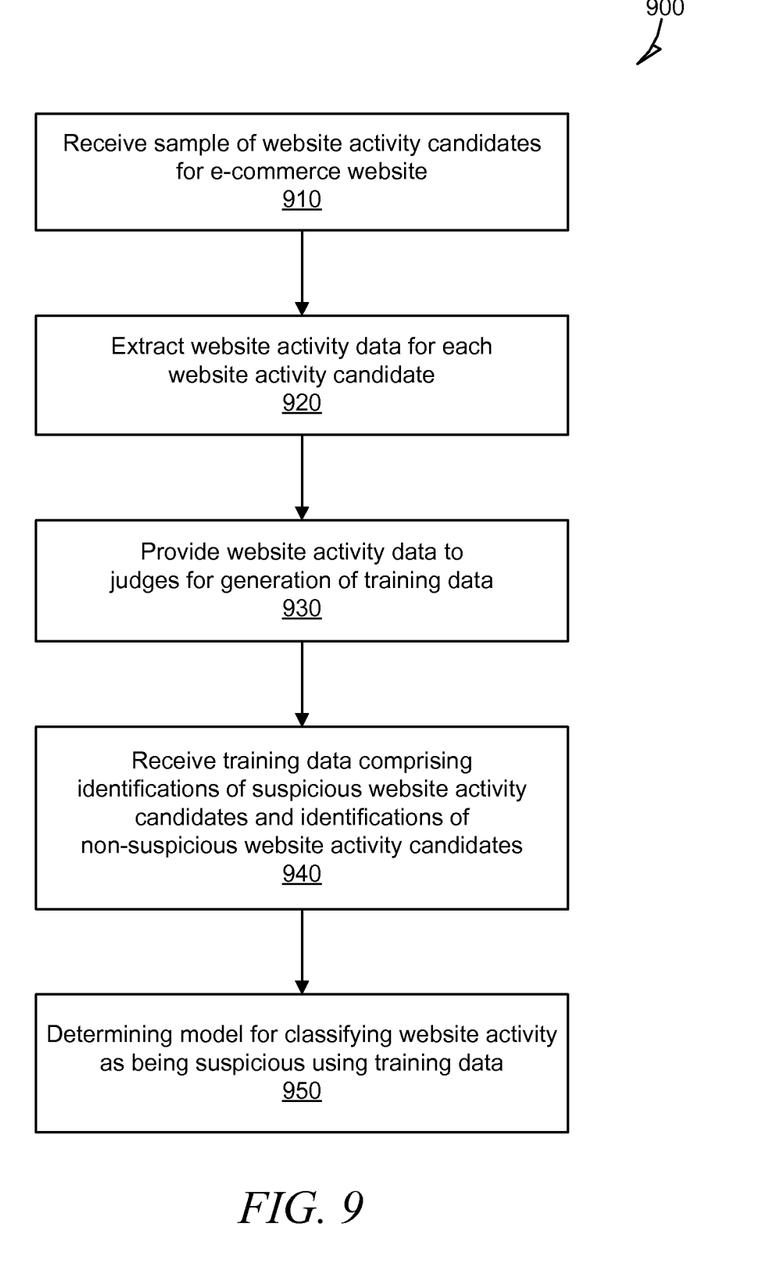
FIG. 9 is a flowchart illustrating a method of training a classifier, in accordance with some embodiments.

FIG. 9 is a flowchart illustrating a method 900 of training a classifier, in accordance with some embodiments. The operations of method 900 may be performed by a system or modules of a system (e.g., classifier system 400 in FIG. 4). At operation 910, a sample of website activity candidates for an e-commerce website can be received (e.g., from database(s) 450 in FIG. 4). In some embodiments, the website activity candidates can comprise any combination of one or more of item listings, seller information, and buyer information. For example the sample of website activity candidates may comprise one-hundred different sellers of items on an e-commerce website. At operation 920, website activity data for each website activity candidate can be extracted. For example, website behavior information (e.g., selling history, account information, etc.) can be extracted for each seller in the sample. At operation 930, the extracted website activity data can be provided to judges (e.g., people) for generation of training data. The judges may provide this training data, such as by submitting their determinations about the sampled website activity candidates via their computing devices. At operation 540, the training data can be received. The training data may comprise identifications of which website activity candidates in the sample of website activity candidates are suspicious and identifications of which website activity candidates in the sample of website activity candidates are not suspicious. At operation 550, a model for classifying website activity on the e-commerce website as being suspicious can be determined using the training data. The determined model can then be used in a similar fashion as previously discussed with respect to the features, methods, and operations of FIGS. 6-8. It is contemplated that the operations of method 900 may incorporate any of the other features disclosed herein.

It is contemplated that any features of any embodiments disclosed herein can be combined with any other features of any other embodiments disclosed herein. Accordingly, these any such hybrid embodiments are within the scope of the present disclosure.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the network 104 of FIG. 1) and via one or more appropriate interfaces (e.g., APIs).

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

A computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 10:
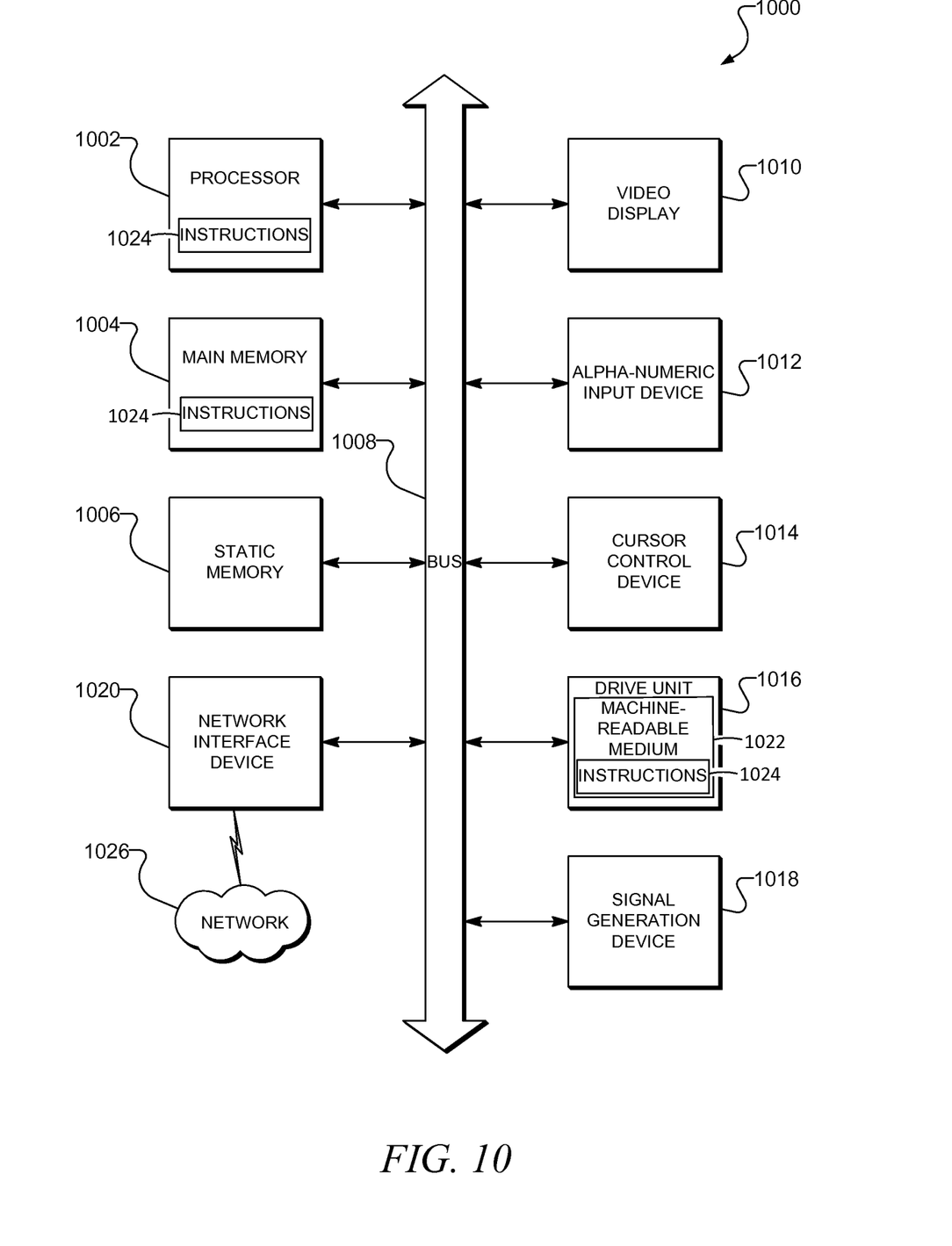
FIG. 10 shows a diagrammatic representation of a machine in the example form of a computer system within which a set of instructions may be executed to cause the machine to perform any one or more of the methodologies discussed herein.

FIG. 10 is a block diagram of a machine in the example form of a computer system 1000 within which instructions 1024 for causing the machine to perform any one or more of the methodologies discussed herein may be executed. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU), a graphics processing unit (GPU) or both), a main memory 1004 and a static memory 1006, which communicate with each other via a bus 1008. The computer system 1000 may further include a video display unit 1010 (e.g., a liquid crystal display (LCD) or a cathode ray tube (CRT)). The computer system 1000 also includes an alphanumeric input device 1012 (e.g., a keyboard), a user interface (UI) navigation (or cursor control) device 1014 (e.g., a mouse), a disk drive unit 1016, a signal generation device 1018 (e.g., a speaker) and a network interface device 1020.

Machine-Readable Medium

The disk drive unit 1016 includes a machine-readable medium 1022 on which is stored one or more sets of data structures and instructions 1024 (e.g., software) embodying or utilized by any one or more of the methodologies or functions described herein. The instructions 1024 may also reside, completely or at least partially, within the main memory 1004 and/or within the processor 1002 during execution thereof by the computer system 1000, the main memory 1004 and the processor 1002 also constituting machine-readable media. The instructions 1024 may also reside, completely or at least partially, within the static memory 1006.

While the machine-readable medium 1022 is shown in an example embodiment to be a single medium, the term "machine-readable medium" may include a single medium or multiple media (e.g., a centralized or distributed database, and/or associated caches and servers) that store the one or more instructions 1024 or data structures. The term "machine-readable medium" shall also be taken to include any tangible medium that is capable of storing, encoding, or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

Transmission Medium

The instructions 1024 may further be transmitted or received over a communications network 1026 using a transmission medium. The instructions 1024 may be transmitted using the network interface device 1020 and any one of a number of well-known transfer protocols (e.g., HTTP). Examples of communication networks include a LAN, a WAN, the Internet, mobile telephone networks, POTS networks, and wireless data networks (e.g., WiFi and WiMax networks). The term "transmission medium" shall be taken to include any intangible medium capable of storing, encoding, or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A computer-implemented method comprising:
   receiving, from a client device, a query for item listings on a network site;
   retrieving a set of item listings comprising text phrases;
   extracting, using one or more processors, a set of text phrases from the set of item listings;
   receiving training data comprising indications made using the set of text phrases, the indications indicating whether each item listing in the set of item listings is suspicious or not suspicious;
   generating, by a machine having a memory and at least one processor, a model by training a classifier on the training data comprising the indications;
   retrieving search results for the query using a search engine;
   generating a score for each item listing in the search results by applying the generated model to each of the item listings in the search results; and
   modifying the search results by lowering or removing items listings in the search results have a score that exceeds a preconfigured threshold before the search results are displayed on the client device of the user.

2. The computer-implemented method of claim 1, wherein the model is configured to:
   determine a score for a particular listing based on text phrases in the particular listing.

3. The computer-implemented method of claim 1, further comprising:
   receiving a new item listing;
   classifying the new item listing as being suspicious by applying the generated model to text phrases in the new item listing; and
   transmitting, to a client device of an administrator of a network site, a notification that the new item listing is suspicious.

4. The computer-implemented method of claim 1, further comprising:
   receiving a new item listing;
   classifying the new item listing as being suspicious by applying the generated model to text phrases in the new item listing; and
   responsive to classifying the new item listing as being suspicious, preventing the new item listing from being posted on the network site.

5. The computer-implemented method of claim 1,
   receiving a new item listing;
   classifying the new item listing as being suspicious by applying the generated model to text phrases in the new item listing; and
   responsive to classifying the new item listing as being suspicious, lowering a ranking position of the new listing in the search results.

6. The computer-implemented method of claim 1, further comprising:
   receiving, from an additional client device associated with an additional user, a new item listing submitted for publication as a listing on the network site;
   determining a score by applying the model the text phrases in the new item listing; and transmitting the score of the new item listing to additional client device of the additional user.

7. The computer-implemented method of claim 1, wherein the indications in the training data are received from a plurality of client devices over a network.

8. The computer-implemented method of claim 1, wherein the text phrases comprises an item title.

9. The computer-implemented method of claim 1, wherein the text phrases comprises an item category.

10. The computer-implemented method of claim 1, wherein the text phrases comprises an item description.

11. The computer-implemented method of claim 1, wherein the training data further comprises item image data.

12. The computer-implemented method of claim 1, wherein the text phrases comprises a price.

13. The computer-implemented method of claim 1, wherein the text phrases comprise bidding activity.

14. A system comprising:
   at least one processor; and
   a memory storing instructions that, when executed by one or more of the processors causes the system to perform operations comprising:
   receiving, from a client device, a query for item listings on a network site;
   retrieving a set of item listings comprising text phrases;
   extracting, using one or more processors, a set of text phrases from the set of item listings;
   receiving training data comprising indications made using the set of text phrases, the indications indicating whether each item listing in the set of item listings is suspicious or not suspicious;
   generating, by a machine having a memory and at least one processor, a model by training a classifier on the training data comprising the indications;
   retrieving search results for the query using a search engine;
   generating a score for each item listing in the search results by applying the generated model to each of the item listings in the search results; and
   modifying the search results by lowering or removing items listings in the search results have a score that exceeds a preconfigured threshold before the search results are displayed on the client device of the user.

15. The system of claim 14, wherein the model is configured to determine a score for a particular listing based on text phrases in the particular listing.

16. The system of claim 14, the operations further comprising:
   receiving a new item listing;
   classifying the new item listing as being suspicious by applying the generated model to text phrases in the new item listing; and
   responsive to classifying the new item listing as being suspicious, preventing the new item listing from being posted on the network site.

17. The system of claim 14, the operations further comprising:
   receiving a new item listing;
   classifying the new item listing as being suspicious by applying the generated model to text phrases in the new item listing; and
   responsive to classifying the new item listing as being suspicious, lowering a ranking position of the new listing in the search results.

18. The system of claim 14, the operations further comprising:
   receiving, from an additional client device associated with an additional user, a new item listing submitted for publication as a listing on the network site;
   determining a score by applying the model the text phrases in the new item listing; and
   transmitting the score of the new item listing to additional client device of the additional user.

19. The system of claim 14, wherein the text phrases comprise at least one of an item title, an item category, an item description, an item image, an item price, and bidding activity.

20. A non-transitory machine-readable storage device storing a set of instructions that, when executed by at least one processor, causes the at least one processor to perform a set of operations comprising:
   receiving, from a client device, a query for item listings on a network site;
   retrieving a set of item listings comprising text phrases;
   extracting, using one or more processors, a set of text phrases from the set of item listings;
   receiving training data comprising indications made using the set of text phrases, the indications indicating whether each item listing in the set of item listings is suspicious or not suspicious;
   generating, by a machine having a memory and at least one processor, a model by training a classifier on the training data comprising the indications;
   retrieving search results for the query using a search engine;
   generating a score for each item listing in the search results by applying the generated model to each of the item listings in the search results; and
   modifying the search results by lowering or removing items listings in the search results have a score that exceeds a preconfigured threshold before the search results are displayed on the client device of the user.

* * * * *